Aug. 31, 1943.       J. M. SIMPSON       2,328,104
TRANSMISSION
Filed March 30, 1942
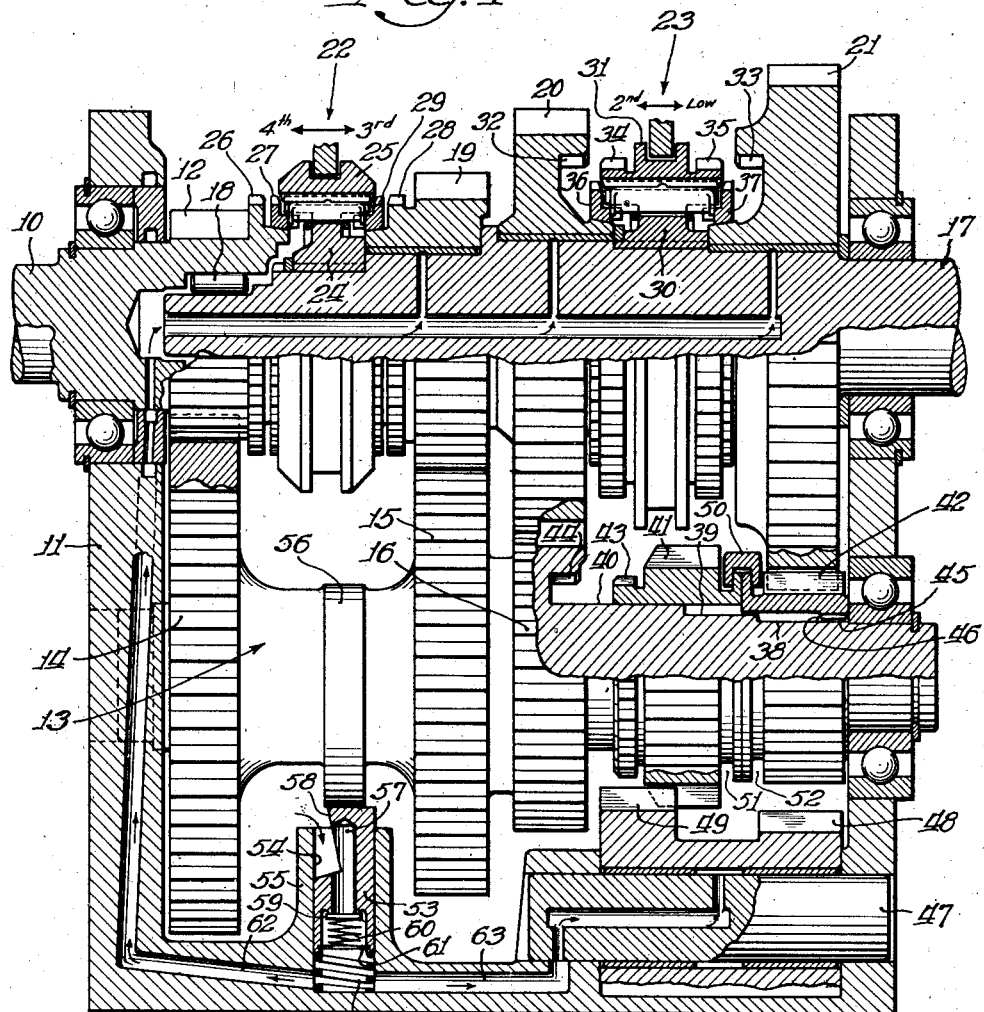
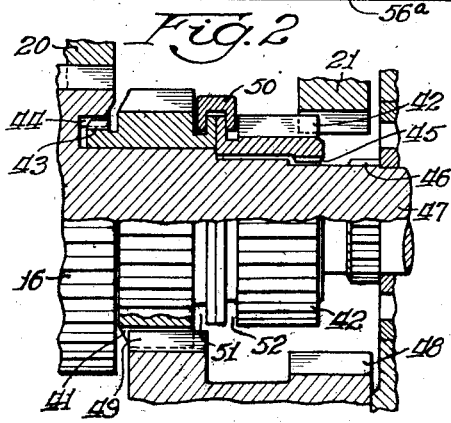
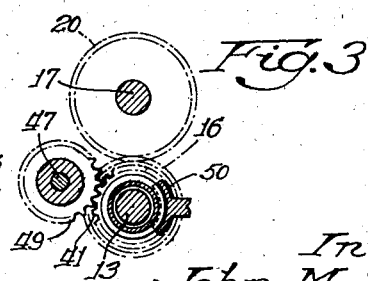
Inventor:
John M. Simpson
By: Edward C. Fitzhugh
Atty.

Patented Aug. 31, 1943

2,328,104

UNITED STATES PATENT OFFICE 2,328,104

TRANSMISSION

John M. Simpson, Muncie, Ind., assignor to Borg-Warner Corporation, Chicago, Ill., a corporation of Illinois Application March 30, 1942, Serial No. 436,819

9 Claims. (Cl. 74—333)

This invention relates to variable speed gearing of the countershaft type which is particularly adaptable for use with automotive vehicles.

The principal object of the invention is to provide a multiple speed transmission including a reverse speed which will have the shortest possible axial dimension.

A more specific object of this invention is to provide a four-speed transmission suitable for use in trucks, buses or the like wherein constant mesh gearing is used throughout, including the reverse ratio.

These and other objects of this invention will become apparent from the following detailed description when taken together with the accompanying drawing in which:

Fig. 1 is a section through the transmission showing in simplified fashion the arrangement of gearing:

Fig. 2 is a fragmentary section through the portion of the transmission which is used to obtain reverse; and Fig. 3 is an end elevation on a much reduced scale showing the actual location of the shaft.

Referring now to Fig. 1 for a detailed description of the invention, the drive shaft 10 of the transmission may be connected to a suitable source of power such as a gasoline engine through means such as a disconnectible clutch, fluid flywheel or torque converter (not shown). Said shaft 10 extends into the transmission casing 11 and has formed on the inner end thereof a drive gear 12. A countershaft in the form of a gear cluster 13 is located in casing 11 with its axis substantially parallel to the axis of shaft 10. Said gear cluster includes a gear 14 in constant mesh with gear 12, a third speed gear 15 and a second speed gear 16.

A driven shaft 17 extends into the casing 11 from the right-hand side thereof (Fig. 1) and is piloted in drive shaft 10 at 18. A gear 19 is loosely mounted on shaft 17 and is constantly in mesh with third speed gear 15. A gear 20 is loosely mounted on driven shaft 17 adjacent gear 19 and is in constant mesh with gear 16 of the counter-shaft. Another gear 21 is loosely mounted on driven shaft 17 and is in constant mesh with first speed and reverse gears to be described later.

Between drive gear 12 and gear 19 is a synchronizing clutch device 22, the function of which is to connect selectively gears 12 and 19 to driven shaft 17. Similarly, between gears 20 and 21 is a synchronizing clutching device 23, the function of which is to connect gears 20 and 21 selectively to driven shaft 17. Clutching device 22 is comprised of a hub member 24 which is splined to driven shaft 17 so as to be rotatable therewith. A slidable collar 25 is splined to hub member 24. Gear 12 is provided with clutch teeth 26 and a blocking element 27 both of which are aligned with collar 25. Similarly, gear 19 is provided with clutch teeth 28 and a blocking element 29 both of which are likewise aligned with collar 25. Thus, movement of collar 25 to the left (Fig. 1) connects gear 12 to driven shaft 17 and movement of the collar in the opposite direction from a central position connects gear 19 to driven shaft 17. The blocking elements and associated gears are provided with the usual cooperating friction surfaces by which the elements are energized into and out of blocking position relative to their respective collars.

Clutch device 23 is provided with a hub member 30 splined to driven shaft 17 and to which is slidably splined a collar 31. Gears 20 and 21 are counterbored and formed with internal clutch teeth 32 and 33, respectively. Collar 31 is formed with external clutch teeth 34 and 35 which are adapted to engage teeth 32 and 33, respectively. A blocking and synchronizing element 36 prevents engagement of teeth 34 with teeth 32 except upon a slight relative reversal of direction of drive between gear 20 and hub member 30, and a synchronizing and blocking element 37 is provided for a like purpose in conjunction with the operation of teeth 35 and 33. It will be noted that due to the counterbored construction of teeth 32 and 33 and the external form of teeth on collar 31, the clutching device 23 may be inserted between gears 20 and 21 and yet take up a minimum of axial space.

Gear cluster 13 is formed with three adjacent cylindrical sections 38, 39 and 40, each of which is of a slightly different diameter. A gear 41 is slidably mounted on section 40 and a gear 42 is slidably mounted on section 39. Gear 41 may be connected to rotate with gear cluster 13 by means of external teeth 43 on said gear 41 which are adapted to engage internal teeth 44 formed in a counterbored portion of gear 16. Gear 42 may be connected to rotate with gear cluster 13 by means of short internal splines 45 (Fig. 2) which are adapted to engage external splines 46 on section 38 of gear cluster 13.

It is contemplated that gears 41 and 42 will be moved simultaneously and will bear the same axial relation to one another at all times. The axial distance between teeth 43 of gear 41 and internal splines 45 of gear 42 is less than the axial distance between internal teeth 44 and external splines 46 so that when gear 41 is being driven from gear cluster 13, gear 42 is freely rotatable with respect thereto and vice versa.

A second countershaft 47 is provided parallel to the axis of driving shaft 10 and driven shaft 17 and disposed adjacent gear cluster 13. The relative positions of countershaft 47, gear cluster 13 and driven shaft 17 is shown in Fig. 3. On said countershaft 47 are rotatably mounted gears 48 and 49, gear 48 being in constant mesh with gear 21. Gear 49 is in constant mesh with gear 41. As shown in Fig. 1, gears 48 and 49 are formed from a single spool, but they may be separate gears suitably coupled so as to rotate together. Both are axially fixed on countershaft 47 and are fixed relative to gear 21 and gear cluster 13. The function of gears 49 and 48 is to provide a reverse drive through the transmission. This reverse drive is effective when gears 41 and 42 are moved to the left (Fig. 1) so that gear 41 is driven from gear cluster 13 and transmits the drive to gear 49 which in turn drives gear 48. Said gear 48 then drives gear 21 in a reverse direction. It will be observed that when gear 41 is being driven, gear 42, although still in contact with gear 21, is free to rotate relative to gear 41 since teeth 45 are free of splines 46.

The simultaneous movement of gears 41 and 42 is effected by means of a yoke 50 which operates in a groove 51 formed in gear 41 and groove 52 formed in gear 42. Suitable means such as is disclosed in a copending application of Palmer Orr, Serial No. 456,972, filed September 2, 1942, may be used to operate clutching devices 22, 23 and yoke 50.

In view of the compact nature of the transmission a pressure lubricating system is provided. The pump is comprised of a plunger 53 operating in a cylindrical opening 54 formed in a boss 55 in casing 11, and a cam 56 rotatable with gear cluster 13 for driving the plunger. A spring 56a normally biases plunger 53 toward cam 56. Plunger 53 has a drilled opening 57 which communicates with a passageway 58 leading outward to the side of plunger 53 into opening 54. The bottom of opening 57 is closed off by means of a disc 59 which is held against opening 57 by means of a spring 60. A washer 61 serves as an abutment for spring 60.

It is contemplated that the entire plunger will be immersed in oil so that as the plunger is reciprocated, the movement upward will unseat disc 59 due to the suction created and will admit oil past disc 59. Upon the return stroke, pressure will be created which, assisted by spring 60, will seat disc 59 against the opening 57, the plunger then acting as a piston to force the oil outward into passages 62 and 63 formed in casing 11. The oil under pressure is then conducted through said passageways to the various bearing surfaces in the transmission.

The speeds obtainable through the transmission are as follows:

For low speed and all forward speeds, gear 42 is slid to the right (Fig. 1) so that teeth 45 engage splines 46 and transmit the drive from gear cluster 13 to gear 42. Clutching device 23 is also moved to the right (Fig. 1) so that teeth 35 engage teeth 33, thereby establishing a driving connection between gear 21 and driven shaft 17. The drive is then from gear 12 to gear 14 and thence through gear cluster 13, gear 42 and gear 21 to driven shaft 17.

For second speed, clutching device 23 is moved to the left so that teeth 34 engage teeth 32 to provide a driving connection between gear 20 and driven shaft 17, the connection between gear 21 and driven shaft 17 being broken during the movement of clutching device 23 to the left. The drive is then from gear 12 to gear 14, gear cluster 13, second speed gear 16 and gear 20 to the driven shaft 17.

For third speed, clutching device 23 is placed in neutral position so that neither gear 20 nor gear 21 is engaged and clutching device 22 is moved to the right (Fig. 1) to connect gear 19 with driven shaft 17. The drive is then from gear 12 to gear 14, gear cluster 13, third speed gear 15 and gear 19 to driven shaft 17.

For direct drive the connection between gear 19 and driven shaft 17 is broken and gear 12 is connected directly to driven shaft 17 by sliding clutch device 22 to the left. Clutching device 23 remains in neutral for direct drive.

For reverse, clutching device 22 is placed in neutral position so that neither gear 19 nor gear 12 is connected to driven shaft 17 and clutching device 23 is moved to the right (Fig. 1) to establish a driving connection between gear 21 and driven shaft 17. Gears 41 and 42 are then moved to the left (Fig. 1) so as to engage teeth 43 with teeth 44 and establish a driving connection between gear cluster 13 and gear 41 while at the same time breaking the connection between gear 42 and the cluster gear. The drive is then from gear 12 to gear 14, gear cluster 13 to gear 41 and thence to gears 49 and 48 on countershaft 47 to gear 21 and driven shaft 17.

It will be apparent from the foregoing description that not only are the forward speed gears in constant mesh but the reverse speed gearing is always in mesh likewise despite the fact that the control gears are slidable to some extent.

Although the group of gears comprising gears 14, 15 and 16 are referred to as a gear cluster, they may also be termed countershaft gears since it is immaterial to the operation of the transmission whether gears 14, 15 and 16 and the shaft upon which they are supported are made from a single casting or forging or are made separately and then secured to rotate together. Clutching devices 22 and 23 may also be given their popular names "synchronizers" which includes the hub member, blocker, friction synchronizing surfaces and the clutching teeth.

It is understood that the foregoing description is merely illustrative of a preferred embodiment of the invention and that the scope of the invention, therefore, is not to be limited thereto but is to be determined by the appended claims.

I claim:

1. A transmission comprising driving and driven shafts, a countershaft, gears on the driving and driven shafts, means for connecting said gear to the driven shaft in driving relation thereto, said countershaft being in the form of a cluster gear having gears in mesh with the gears on the driving and driven shafts, a plurality of adjacent cylindrical sections on the cluster gear, said cylindrical sections being of different diameters, a gear slidably mounted on the section of largest diameter, a gear slidably mounted on the adjacent and next smaller diameter section, and splines on a portion of the third section, said gear slidably mounted on the adjacent section having internal teeth which are meshable with the splines on the third section to form a driving connection therewith.

2. A transmission as described in claim 1, the gear on the largest section having a portion which is adapted to telescope into one of the gears of the gear cluster, and clutch means on the telescoping portions of the gears to provide a driving connection between said gears.

3. A transmission as described in claim 1, the gear on the largest section having a portion which is telescoped into one of the gears of the gear cluster, and interengageable elements on the telescoping portions of the gears for providing a driving connection between said telescoping gears.

4. A transmission comprising driving and driven shafts, a countershaft, a pair of cooperating gears, one on the driving shaft and the other on the countershaft, a pair of constant mesh gears, one on the countershaft and the other on the driven shaft, means for connecting the last mentioned gear to the driven shaft in driving relation thereto, an additional gear on the countershaft, an idler shaft, a pair of gears on the idler shaft in constant mesh with said additional gear on the countershaft and with the gear on the driven shaft respectively, means for simultaneously shifting both said additional gear and the countershaft gear of the second mentioned pair of gears axially on the countershaft, and means controlled by said shifting for alternately clutching said additional gear and the countershaft gear of the second pair of gears to the countershaft.

5. A transmission comprising driving and driven shafts, a countershaft, a pair of cooperating gears, one on the driving shaft and the other on the countershaft, a pair of constant mesh gears, one on the countershaft and the other on the driven shaft, an additional gear on the countershaft, an idler shaft, a pair of gears on the idler shaft in constant mesh with the additional gear on the countershaft and with the gear on the driven shaft respectively, said additional gear having external jaw clutch teeth and said countershaft being provided with internal jaw clutch teeth meshable with said external jaw clutch teeth to establish a driving connection between said countershaft and said additional gear, and means for alternatively establishing a driving connection between said countershaft and the countershaft gear of said second pair of gears.

6. A transmission comprising driving and driven shafts, a countershaft, a pair of cooperating gears, one on the driving shaft and the other on the countershaft, a pair of constant mesh gears, one on the countershaft and the other on the driven shaft, an additional gear on the countershaft, an idler shaft, a pair of gears on the idler shaft in constant mesh with said additional gear on the countershaft and with the gear on the driven shaft respectively, the countershaft gear of the second pair of gears being provided with internal clutch teeth, the countershaft being provided with external clutch teeth meshable with said internal clutch teeth to establish a driving connection between the countershaft and said countershaft gear of the second pair of gears, and means for establishing an alternative driving connection between the countershaft and said additional gear.

7. A transmission as described in claim 5, including a third pair of constant mesh gears, said internal jaw clutch teeth being located within one of the gears of said third pair of gears.

8. A transmission comprising driving and driven shafts, a countershaft, a pair of cooperating gears, one on the driving shaft and the other on the countershaft, a pair of constant mesh gears, one on the countershaft and the other on the driven shaft, means for selectively connecting the last mentioned gear to the driven shaft in driving relation thereto for establishing low and reverse speeds, said last mentioned gear being disconnected from the driven shaft when the transmission is operating in other speeds, an additional gear on the countershaft, an idler shaft, a pair of gears on the idler shaft in constant mesh with the additional gear on the countershaft and with the gear on the driven shaft, respectively, means for moving the said additional gear and the countershaft gear of the second pair of gears simultaneously axially of the countershaft, and means controlled by said movement for alternatively clutching the additional gear and the countershaft gear of the second pair of gears to the countershaft.

9. A transmission comprising driving and driven shafts, a countershaft, a pair of cooperating gears, one on the driving shaft and the other on the countershaft, a pair of constant mesh gears, one on the countershaft and the other on the driven shaft, means for connecting the last mentioned gear to the driven shaft in driving relation thereto, an additional gear on the countershaft, an idler shaft, a pair of gears on the idler shaft in constant mesh with the additional gear on the countershaft and with the gear on the driven shaft respectively, means for simultaneously shifting both said additional gear and the countershaft gear of the second mentioned pair of gears axially on the countershaft, and means controlled by said shifting for alternatively clutching said additional gear and the countershaft gear of the second pair of gears to the countershaft, said additional gear having external jaw clutch teeth and said countershaft being provided with internal jaw clutch teeth meshable with said external jaw clutch teeth to establish a driving connection between said countershaft and said additional gear, said additional gear and the countershaft gear of the second pair of gears each having an annular groove, a common operator received in both grooves for moving the additional gear and the countershaft gear of the second pair of gears simultaneously axially of the countershaft, and means controlled by such movement for alternatively clutching the additional gear and the countershaft gear of the second pair of gears to the countershaft.

JOHN M. SIMPSON.